March 18, 1958 P. D. FREDERICK 2,826,849
FISHING LINE AND PLUG RETRIEVER
Filed Feb. 17, 1956
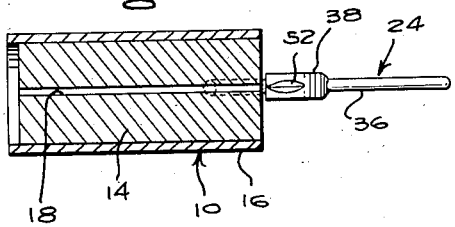
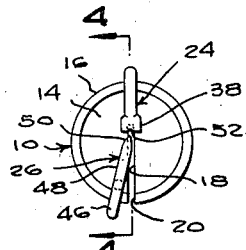
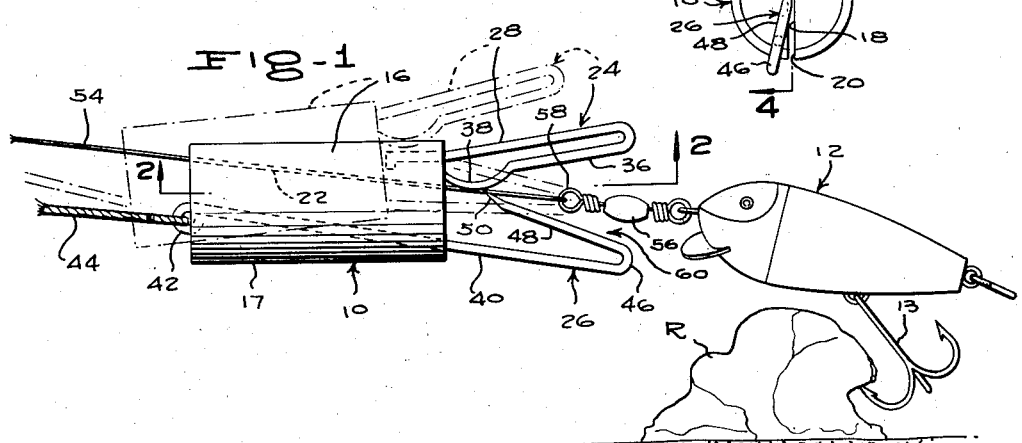
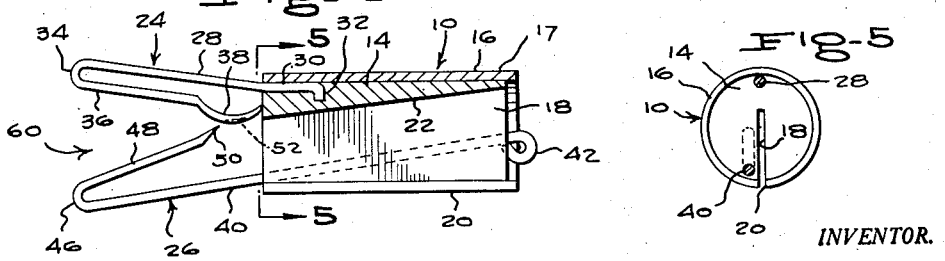
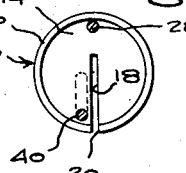
INVENTOR.
PALMER D. FREDERICK
BY
McMorrow, Berman + Davidson
ATTORNEYS United States Patent Office 2,826,849
Patented Mar. 18, 1958

2,826,849

FISHING LINE AND PLUG RETRIEVER

Palmer D. Frederick, Sacramento, Calif.

Application February 17, 1956, Serial No. 566,233

4 Claims. (Cl. 43—17.2)

Summarized briefly, this invention is a fishing line and plug retriever including a block slidable along the line to the snagged plug, the block having means engaging in the swivel of the plug so that on the exertion of pull upon a cord connected to the block, the hook of the plug will be bent, to disengage the plug or lure from the underwater obstruction on which it has been snagged.

By way of background, it may be noted that there is a continuing, heavy loss of relatively expensive plugs or lures, resulting from their being snagged upon rocks or other underwater obstructions. While devices have been conceived for the purpose of retrieving the fishing gear, many of these are not readily adaptable to the disengagement of plugs under all circumstances, and the main object of the present invention is to provide, accordingly, a generally improved retriever that will be particularly adapted for the disengagement of the plug in almost all situations in which the plug has become snagged, this object being achieved by an arrangement wherein the retriever will engage the plug at the line-attaching swivel thereof, this portion of the plug being fully exposed and clear of the obstruction in almost every instance.

Among more specific objects of the invention are the following:

First, to provide a retriever wherein a guide foot will cooperate with a swivel-penetrating member in such a manner as to turn the swivel to a position in which said member will enter the same, thus to connect the lure directly to the retrieving device;

Second, to relieve the fishing line of all strain during the retrieving operation;

Third, to form the retrieving device in a manner such that it will function efficiently in every instance in which the swivel is exposed adjacent the obstruction;

Fourth, to permit manufacture of the retrieving device at a minimum of cost;

Fifth, to eliminate completely the necessity of manipulation of the retriever by the user for the purpose of engaging the plug; and Sixth, to so design the swivel engaging member of the device that it will be capable of formation from relatively thin wire material to allow it to enter even small swivel eyes, while at the same time causing the eye to shift to a location after it has been engaged, in which location said member will provide a strong connection between the eye and a block-attached retrieving cord.

Other objects will appear from the following description, the claims appended thereto, and from the annexed drawing, in which like reference characters designate like parts throughout the several views, and wherein:

Figure 1 is a side elevational view showing the retriever in use, the retriever being shown in full lines as it approaches the snagged plug and in dotted lines in the position it assumes following engagement with the plug;

Figure 2 is a longitudinal section substantially on line 2—2 of Figure 1;

Figure 3 is an end elevational view of the retrieving device per se as seen from the right of Figure 1;

Figure 4 is a longitudinal section on line 4—4 of Figure 3; and

Figure 5 is a transverse sectional view on line 5—5 of Figure 4.

The retriever 10 constituting the invention has been illustrated in Figure 1 adjacent a conventional plug 12 having a hook 13 snagged upon an underwater obstruction such as a rock R.

The retriever comprises a cylindrical block 14 of a material such that the block will slide downwardly upon a fishing line. Receiving the block is a protective, open-ended sleeve 16, which, with the block, defines a body 17.

An end-to-end slot 18, formed in block 14, lies in a plane disposed diametrically of the block, and along its open side is in registration with an end-to-end slot 20 of sleeve 16. The inner or closed side 22 of slot 18 is inclined obliquely to the axis of block 14 (see Figure 4), so that at its trailing end, slot 18 extends almost over the full diameter of block 14, while being extended only slightly beyond the center point of the block at the leading end thereof. The purpose of this arrangement is to cause the body 17, when the device slides along the fishing line toward lure 12, to be tilted to a position in which its axis is oblique to the length of the fishing line as shown in full lines in Figure 1.

Projecting forwardly from the leading end of the body 17 are a guide foot generally designated 24 and a swivel-engaging member generally designated 26.

Guide foot 24 is formed from a single length of comparatively rigid wire material, bent into the general shape of a narrow, elongated U, and including an outer leg 28 integral at its inner end with a longitudinal extension 30, extending in longitudinally contacting relation with the inner surface of split sleeve 16 and formed with a lateral extension 32, to insure firm embedding of extension 30 in the material of block 14. Extension 30 as shown in Figure 4 is disposed at a wide obtuse angle to leg 28. Therefore, since extension 30 is in parallelism with the axis of block 14, the leg 28 extends obliquely to said axis.

At its outer end, leg 28 merges into a short, arcuate bight 34 merging in turn into a shorter, inner leg 36 parallel for the greatest part of its length with leg 28, and having a free inner end portion 38 arcuately bowed outwardly from leg 28 and terminating at the adjacent end surface of block 14 adjacent the wall 22 of slot 18.

As shown in Figure 3, guide foot 24 is disposed wholly in a plane common to that of slot 18.

Member 26 is also formed from a single length of wire. The member 26 includes an elongated straight leg 40 extending the full length of block 14 in closely spaced parallel relation to the plane of slot 18 (see Figure 5). Leg 40 extends in substantial parallelism with wall 22 of slot 18, and at the trailing end of the retriever projects slightly beyond block 14 and is formed with an eye 42 to which is connectible a strong retrieving cord or other flexible element 44.

The member 26 has a portion projecting beyond the leading ends of block 14, and this portion is approximately V shaped as shown in Figures 1 and 4. This portion includes leg 40, merging into a bight 46 in turn merging into a short, resilient leg 48, the free end of which terminates in a sharpened point 50 that normally engages in a longitudinal recess 52 formed in the outer or convex face of the arcuate extension 38. As shown in Figure 2, extension 38 is of flattened formation, to provide a wide surface adapted to engage the swivel of the fishing plug.

A fishing line has been designated at 54, and is connected to plug 12 by a conventional swivel 56 having a line-attaching eye 58.

Referring tot Figure 3, it will be observed that the planes of the guide foot 24 and swivel-engaging member 26 intersect at obtuse angles to one another, where the wall 22 terminates at the leading end of block 14, this being the end of the block, as previously noted, at which the smaller end of the slot 18 opens.

Further, it will be noted that as shown in Figure 4, the guide foot and the member 26 diverge at acute angles to one another in a direction away from block 14, to provide a tapering throat 60, so designed as to permit movement of the swivel to a position in which it will be engageable by member 26.

In use of the device, when the lure becomes snagged the body 16 is fitted onto the fishing line, with the line extending along the wall 22 of slot 18. The oblique disposition of wall 22 to the axis of body 17 locates the center of gravitation of the device relative to the line in such a manner as to dispose the greatest part of the weight of the body below the line, thus stabilizing the position of the device upon the fishing line and reducing to a minimum the possibility of rotation thereof during its movement to the lure 12.

As the device approaches the lure, the swivel 56 enters throat 60 (see the full line position of the block in Figure 1) and ultimately the eye 58 will be engaged by the wide, convex face of extension 38 of guide foot 24. The shape of extension 38 is such as to rotate the eye 58 to a position flat against the extension so that it will be capable of receiving the point 50 of the member 26 during the further movement of the block toward the lure. The resiliency of the leg 48 causes the point 50 to move away from extension 38 a distance sufficient for passage of eye 58 therebetween.

As a next step, the user pulls upon flexible element 44, and this causes the eye 58 to move along the length of leg 48 to the bight 46 as shown in dotted lines in Figure 1.

A strong pull is now exerted upon element 44, to bend the hook 13 for the purpose of disengaging the same from the underwater obstruction. When the hook has been disengaged, the lure and retriever are pulled to the surface along the line 54, and one need now merely remove the member 26 from the swivel and replace the bent hook. The hooks are, of course, very inexpensive as compared to the cost of the fishing lure.

In actual use of a device formed according to the invention, it has been found that the retriever operates efficiently to retrieve plugs under many conditions, and thus permits the fisherman to effect a considerable saving, the amount of which saving is substantially greater than the cost of the retrieving device itself.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A retrieving device for snagged fishing plugs adapted for passage along a fish line to the eye of a line-attaching swivel connected to the plug, said retriever comprising: an elongated body having an end-to-end slot, said slot having an inner longitudinal wall oblique to the length of the body and adapted for slidably contacting a fishing line passing through the slot, for gravitational movement of the body along said line to the snagged plug, said wall being so inclined as to dispose the greatest part of the weight of the body below the fishing line; a guide foot formed as an elongated, U-shaped member projecting forwardly from one end of the body, one leg of said member being anchored to the body and the other leg being formed, adjacent said end of the body, with an arcuate, wide extension disposed adjacent the point at which said wall of the slot intersects with said end of the body, said extension being proportioned for engaging the eye of the swivel to rotate it to a position in which the eye lies flat against one face of the extension; a swivel-engaging member also formed substantially to a U shape and having one leg anchored in the body adjacent the slot, the other leg of the second named member having a free end terminating adjacent said extension and formed with a point for readily passing through the eye when the eye is in said position; and a flexible element connected to the other end of the body for pulling the body and the engaged lure to the surface.

2. A retrieving device for snagged fishing plugs adapted for passage along a fish line to the eye of a line-attaching swivel connected to the plug, said retriever comprising: an elongated body having an end-to-end slot, said slot having an inner longitudinal wall oblique to the length of the body and adapted for slidably contacting a fishing line passing through the slot, for gravitational movement of the body along said line to the snagged plug, said wall being so inclined as to dispose the greatest part of the weight of the body below the fishing line; a guide foot formed as an elongated, U-shaped member projecting forwardly from one end of the body, one leg of said member being anchored to the body and the other leg being formed, adjacent said end of the body, with an arcuate, wide extension disposed adjacent the point at which said wall of the slot intersects with said end of the body, said extension being proportioned for engaging the eye of the swivel to rotate it to a position in which the eye lies flat against one face of the extension; a swivel-engaging member also formed substantially to a U shape and having one leg anchored in the body adjacent the slot, the other leg of the second named member having a free end terminating adjacent said extension and formed with a point for readily passing through the eye when the eye is in said position; and a flexible element connected to the other end of the body for pulling the body and the engaged lure to the surface, said face of the extension having a longitudinally extending recess normally receiving said point of the second named member.

3. A retrieving device for snagged fishing plugs adapted for passage along a fish line to the eye of a line-attaching swivel connected to the plug, said retriever comprising: an elongated body having an end-to-end slot, said slot having an inner longitudinal wall oblique to the length of the body and adapted for slidably contacting a fishing line passing through the slot, for gravitational movement of the body along said line to the snagged plug, said wall being so inclined as to dispose the greatest part of the weight of the body below the fishing line; a guide foot formed as an elongated, U-shaped member projecting forwardly from one end of the body, one leg of said member being anchored to the body and the other leg being formed, adjacent said end of the body, with an arcuate, wide extension disposed adjacent the point at which said wall of the slot intersects with said end of the body, said extension being proportioned for engaging the eye of the swivel to rotate it to a position in which the eye lies flat against one face of the extension; a swivel-engaging member also formed substantially to a U shape and having one leg anchored in the body adjacent the slot, the other leg of the second named member having a free end terminating adjacent said extension and formed with a point for readily passing through the eye when the eye is in said position; and a flexible element connected to the other end of the body for pulling the body and the engaged lure to the surface, said face of the extension having a longitudinally extending recess normally receiving said point of the second named member, said other leg of the second named member being of resilient material so as to shift away from the extension, for passage of the eye between the extension and the point preliminary to movement of the point through the eye.

4. A retrieving device for snagged fishing plugs adapted for passage along a fish line to the eye of a line-attaching swivel connected to the plug, said retriever comprising: an elongated body having an end-to-end slot, said slot having an inner longitudinal wall oblique to the length of the body and adapted for slidably contacting a fishing line passing through the slot, for gravitational movement of the body along said line to the snagged plug, said wall being so inclined as to dispose the greatest part of the weight of the body below the fishing line; a guide foot formed as an elongated, U-shaped member projecting forwardly from one end of the body, one leg of said member being anchored to the body and the other leg being formed, adjacent said end of the body, with an arcuate, wide extension disposed adjacent the point at which said wall of the slot intersects with said end of the body, said extension being proportioned for engaging the eye of the swivel to rotate it to a position in which the eye lies flat against one face of the extension; a swivel-engaging member also formed substantially to a U shape and having one leg anchored in the body adjacent the slot, the other leg of the second named member having a free end terminating adjacent said extension and formed with a point for readily passing through the eye when the eye is in said position; and a flexible element connected to the other end of the body for pulling the body and the engaged lure to the surface, said face of the extension having a longitudinally extending recess normally receiving said point of the second named member, said other leg of the second named member being of resilient material so as to shift away from the extension, for passage of the eye between the extension and the point preliminary to movement of the point through the eye, the guide foot lying in a plane common to that of the slot, the swivel engaging member lying in a plane obtusely related to the plane of the guide foot, said planes interseting substantially at the location at which said wall of the slot intersects the first named end of the body.

References Cited in the file of this patent

UNITED STATES PATENTS

| | | |
|---|---|---|
| 1,042,630 | Wetmore | Oct. 29, 1912 |
| 2,482,716 | Noelcke | Sept. 20, 1949 |
| 2,534,790 | Moore | Dec. 19, 1950 |
| 2,608,785 | Hall | Sept. 2, 1952 |
| 2,714,777 | Peak | Aug. 9, 1955 |